(12) United States Patent  
Doran (10) Patent No.: US 7,686,667 B2
(45) Date of Patent: Mar. 30, 2010

(54) INTERNAL DISPLACEMENT VAPOR PRESSURE ROTATION DEVICE

(76) Inventor: Edward Doran, 3344 W. Cuyler, Chicago, IL (US) 60618

( * ) Notice: Subject to any disclaimer, the term of this patent is extended or adjusted under 35 U.S.C. 154(b) by 301 days.

(21) Appl. No.: 11/859,236

(22) Filed: Sep. 21, 2007

(65) Prior Publication Data

US 2008/0125003 A1  May 29, 2008

Related U.S. Application Data

(60) Provisional application No. 60/867,181, filed on Nov. 25, 2006.

(51) Int. Cl.
 *A63H 29/14* (2006.01)
 *A63H 29/00* (2006.01)
(52) U.S. Cl. .................. 446/167; 446/176; 446/283; 434/283
(58) Field of Classification Search .......... 446/166, 446/167, 176, 199, 267; 434/283, 298; 60/675
See application file for complete search history.

(56) References Cited

U.S. PATENT DOCUMENTS

| 50,151 | A | * | 9/1865 | Monson | 60/675 |
|---|---|---|---|---|---|
| 242,454 | A | * | 6/1881 | Iske | 60/675 |
| 243,909 | A | * | 7/1881 | Iske | 60/675 |
| 250,265 | A | * | 11/1881 | Landis | 60/675 |
| 250,821 | A | * | 12/1881 | Landis | 60/675 |
| 253,868 | A | * | 2/1882 | Iske | 60/675 |
| 256,482 | A | * | 4/1882 | Iske | 60/675 |
| 271,639 | A | * | 2/1883 | Iske | 60/675 |
| 389,515 | A | * | 9/1888 | Iske | 60/675 |
| 2,240,906 | A | * | 5/1941 | Harold | 40/412 |
| 2,398,471 | A | * | 4/1946 | Short et al. | 60/641.6 |
| 2,402,463 | A | * | 6/1946 | Sullivan | 446/199 |
| 2,513,692 | A | * | 7/1950 | Tubbs | 60/531 |
| 4,509,329 | A | * | 4/1985 | Breston | 60/531 |
| 6,240,729 | B1 | * | 6/2001 | Yoo et al. | 60/641.1 |

* cited by examiner

*Primary Examiner*—Kien T Nguyen (57) ABSTRACT

A mechanical toy having two enclosed chambers, one positioned above the other, connected by a tube; a vaporizing medium contained within the enclosed chambers and tube; an object within each chamber to displace the vaporizing medium; a rotational shaft centrally connected to the tube and chambers; support arms connected to ends of the rotational shaft at bearing points; means for exciting the vaporizing medium within the lower chamber to create an increase in vapor pressure within the lower chamber relative to the upper chamber that exerts force upon the vaporizing medium within the lower chamber to communicate the vaporizing medium through the tube into the upper chamber, displaced by the object within the upper chamber creating an imbalance, allowing gravity to act upon the upper chamber when a sufficient amount of the vaporizing medium has collected within the upper chamber pulling the upper chamber downward around the rotational shaft in the direction of the imbalance.

8 Claims, 8 Drawing Sheets

INTERNAL DISPLACEMENT VAPOR PRESSURE ROTATION DEVICE

BACKGROUND OF THE INVENTION

1. Field of the Invention

This invention relates in general to a heat engine, and in particular to improvements to my prior U.S. Pat. No. 7,150,670 regarding an engine that transforms heat energy partially into rotating mechanical energy with the assistance of gravity useful in actuating amusement and demonstrating concepts of physics for the purpose of education.

2. Description of the Prior Art

In order to provide background information so that the invention may be completely understood and appreciated in its proper context, reference is made to prior art U.S. Patent Numbers in the following paragraphs.

My prior U.S. Pat. No. 7,150,670 discloses a two chamber rotational device that employs asymmetric chamber construction to provide 360-degree unidirectional rotation. The present invention improves upon the prior art by utilizing displacement objects within the chambers to provide rotation in a predetermined direction. The use of displacement objects permit the chambers to be symmetrically constructed while still providing rotation in a predetermined direction. The displacement objects may either be initially configured to provide 360-degree unidirectional rotation or oscillating rotation upon repeated rotation intervals.

U.S. Pat. Nos. 242,454, 243,909 and 389,515 all illustrate multiple tube and chamber structures in order to provide 360-degree unidirectional rotation. Reducing each device to a single tube connecting two chambers introduces the consequence of random oscillating device rotation. The present invention differs from the prior art by utilizing a displacement object within each of the two chambers to provide rotation in a predetermined direction and thus eliminates the effect of random device oscillation.

Within the prior art there are many examples of two chamber heat engines that create an oscillating motion. Included in this list are U.S. Pat. Nos. 250,821; 253,868 and 271,639. The present invention differs from the prior art in that the present invention utilizes an axis that permits full 360-degree rotation and internal chamber displacement objects that provide rotation in a predetermined direction. The displacement objects may be initially configured to provide consistent device oscillation upon repeated rotation intervals.

In order to provide 360-degree unidirectional rotation prior art introduces a variety of constructs including additional chambers, gears, valves or pistons. Included in this list are U.S. Pat. Nos. 50,151; 250,265; 256,482; 2,513,692; 4,509,329 and 6,240,729. The extra complexity due to adding chambers is not required by the present invention. The present invention requires no more than one pair of chambers connected by a tube. The present invention does not require gears or internal moving parts with the exception of the liquid and gas that is communicated between the chambers as the simplicity of device embodiment is considered essential for enhancing the clarity of operation for educational purposes.

Whatever the precise merits, features and advantages of the above cited references, none of them achieves or fulfills the purposes of the explicit application of internal chamber displacement objects to provide rotation in a predetermined direction about an axis to actuate amusement and more clearly demonstrate concepts including but not limited to the first and second laws of thermodynamics, Charles' and Boyle's gas laws, the law of gravity, the dynamics of rotational motion, fluid mechanics, hydrostatics and the principle of liquid displacement as does the present invention.

SUMMARY OF THE INVENTION

This invention relates to an enclosed two chamber rotating device that provides periodic rotation in a predetermined direction useful in actuating amusement and demonstrating concepts of physics for the purpose of education.

Specifically this device is shown as an enclosed hollow structure with two divided spaces or chambers connected by an elongated hollow member in the form of a tube that extends to an appropriate distance into the interior of each chamber. The enclosed hollow structure contains a vaporizing medium. Each of the chambers contains an object that displaces the vaporizing medium, hereafter referred to as displacement objects. An axis of rotation is maintained between the two chambers perpendicular to the connecting hollow member. The device is arranged in such a manner that one chamber is situated above the other. Initially the lower chamber will contain a majority of the vaporizing medium in liquid form. A heat source is maintained at the lower chamber. The upper chamber being farther from the heat source will have a lower temperature than the lower chamber. The heat source at the lower chamber will excite the liquid within the lower chamber producing an increase in vapor pressure within the lower chamber relative to the upper chamber. The increase in vapor pressure will exert force upon the liquid within the lower chamber to communicate or drive the liquid through the connecting hollow member into the upper chamber. When a sufficient amount of liquid has collected in the upper chamber, the upper chamber will contain more mass than the lower chamber. The displacement object in the upper chamber will become engulfed by the liquid and cause the liquid to collect in an off center manner creating a weight imbalance within the upper chamber. Gravity acting upon the upper chamber will pull it downward around the axis of rotation in the direction of the weight imbalance effectively switching the positions of the upper and lower chambers, hereafter referred to as a cycle. The displacement object within each chamber can either be positioned to make repeated cycles produce 360-degree unidirectional rotation of the device or to make repeated cycles produce 180-degree or near 180-degree oscillating rotation.

With the above and such other objects in view, as may hereinafter more fully appear, the invention consists of novel construction, combination and arrangement of parts, as will be hereinafter more fully described, and illustrated in the accompanying drawing, wherein are shown embodiments of this invention, but it is to be understood that changes, variations, and modifications may be resorted to which fall within the scope of the invention, as described.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

A preferred embodiment of the present invention will now be described in connection with FIGS. 1 and 2 of the drawing followed by alternate embodiments with FIGS. 3, 4, 5, 6, 7 and 8 of the drawing.

Figure 1:
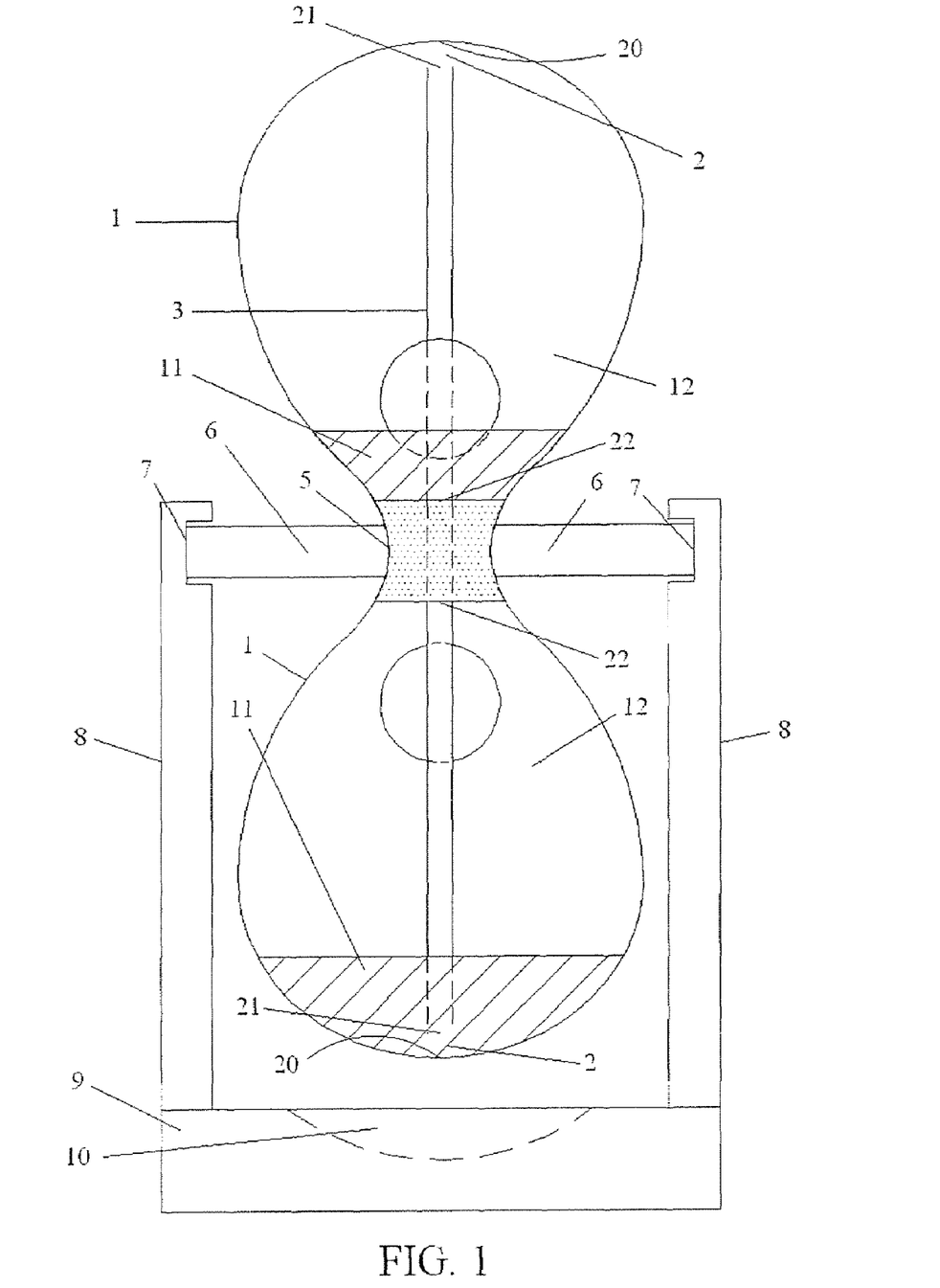
FIG. 1 is a frontal view of an internal displacement vapor pressure rotation device in which a hollow member connects two enclosed chambers one above the other each partially filled with a liquid.

As shown in FIG. 1 two enclosed chambers 1 also referred to as reservoirs are presented one above the other. By convention the same number is used to identify parts that are identical; for example, the number one is used to identify both the upper and lower chambers. A hollow member 3, in the form of a tube, connects the two chambers. The hollow member extends into each chamber allowing for only a small distance 2 between the open ends 21 of the hollow member and the internal surface 20 of each chamber away from the points of entry 22 into each chamber by the hollow member. A vaporizing medium in the form of a liquid 11 within the lower chamber when heated by a heat source 10 about a base 9 will excite the liquid and increase the vapor pressure within the enclosed space 12 of the lower chamber relative to that which exists within the enclosed space of the upper chamber. The said small distance between the internal surface of the chamber and the open end of the hollow member enables the open end within the lower chamber to remain substantially submerged within the liquid to ensure a majority of the liquid is communicated or driven through the hollow member from the lower chamber to the upper chamber as the vapor pressure increases within the lower chamber exerting force upon the liquid within the lower chamber. When a substantial amount of the liquid collects in the upper chamber, gravity acting upon the upper chamber will pull the upper chamber downward around a supporting rotational shaft that defines the axis of rotation 6 switching the positions of the upper and lower chambers. The shaft is connected about its center to the hollow member between the two enclosed chambers 5. The shaft is connected at its ends to bearing points 7 that are supported by arms 8 connected to the base.

The hollow member and enclosed chambers are preferably comprised of a light transmissive material such as heat and shatter resistant glass or silica to promote easy observation of the physical phenomena. The heat source is preferably comprised of an electrically resistive component that emits light such as a 10 to 40 watt incandescent or halogen light bulb to simultaneously illuminate the device while providing heat. The vaporizing medium in the form of a liquid is preferably comprised of material with a low boiling point such as ethanol alcohol or acetone and more preferably of a non-flammable material with said low boiling point such as methylene chloride. The enclosed space within the chambers and connecting hollow member is preferably substantially devoid of air in order to provide a lower vaporizing temperature of the vaporizing medium.

Figure 2:
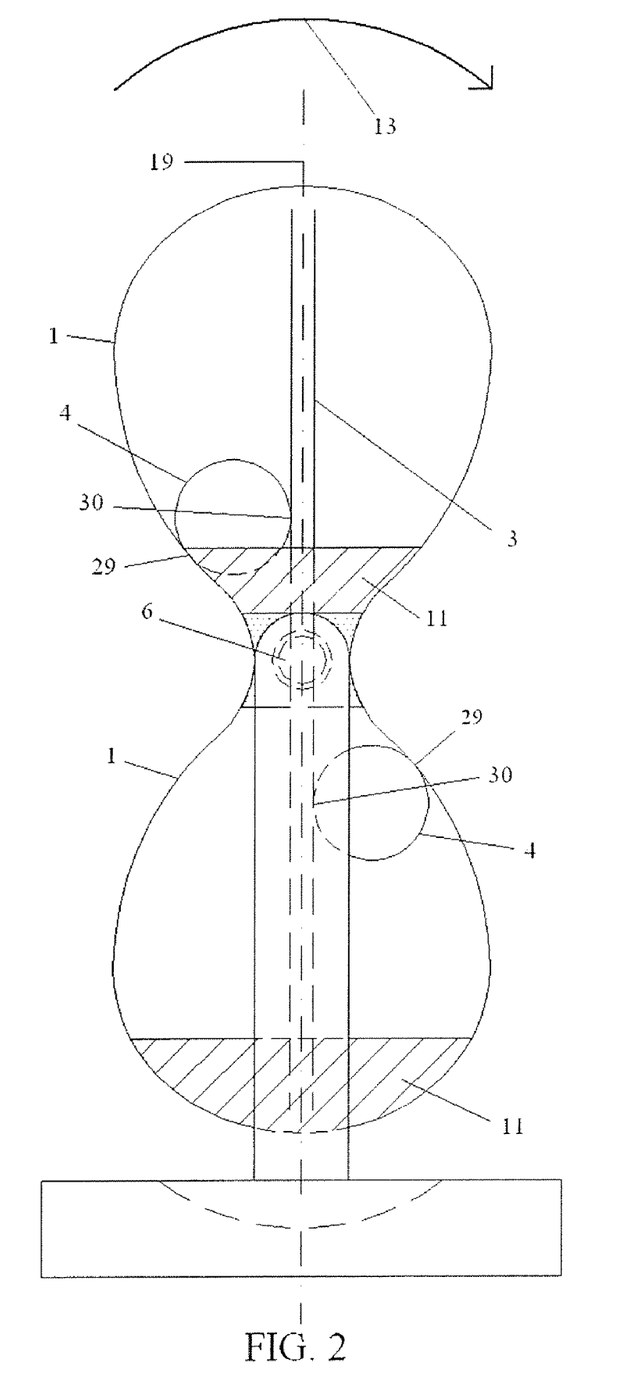
FIG. 2 is a side view of an internal displacement vapor pressure rotation device illustrating the displacement objects with respect to a vertical plane running through the two chambers in which unidirectional rotation is created.

FIG. 2 depicts the side view of the device to illustrate the position of two displacement objects 4 separately contained within two chambers 1 with respect to a vertical plane 19 running lengthwise through a rotational shaft that defines the axis of rotation 6 and the two chambers. One chamber is positioned above the other. A hollow member 3, in the form of a tube, connects and extends into the two chambers. The displacement objects within the chambers are positioned on opposing sides of the vertical plane running lengthwise through the chambers. The displacement objects may be fastened to the internal surface of their respective containing chambers 29, to the hollow member within their respective containing chambers 30 or by any combination or variation therein so long as the displacement objects remain fixed. The displacement objects may be hollow or solid so long as the total mass of the displacement object in one chamber is equivalent to that of the displacement object in the other chamber ensuring a balanced device with respect to the vertical plane running lengthwise through the device without taking into account the vaporizing medium 11 contained within the device. As a substantial amount of vaporizing medium in liquid form collects in the upper chamber by means described within the preceding paragraphs, the displacement object within the upper chamber will become engulfed or surrounded by the liquid making more liquid collect to the side of the vertical plane that does not contain the displacement object creating a weight imbalance. Gravity acting upon the imbalance within the upper chamber will create a moment of rotational force in the direction of the heavier side of the chamber which is the side that does not contain the displacement object as indicated by the arrow 13. The moment of rotational force pulls the upper chamber downward around the axis of rotation switching the position of the upper and lower chambers, referred to as a cycle. The displacement object within each chamber is configured in such a way as to ensure that the weight imbalance always occurs on the same side of the vertical plane at each cycle regardless of which chamber is positioned above to produce rotation in a single direction.

Figure 3:
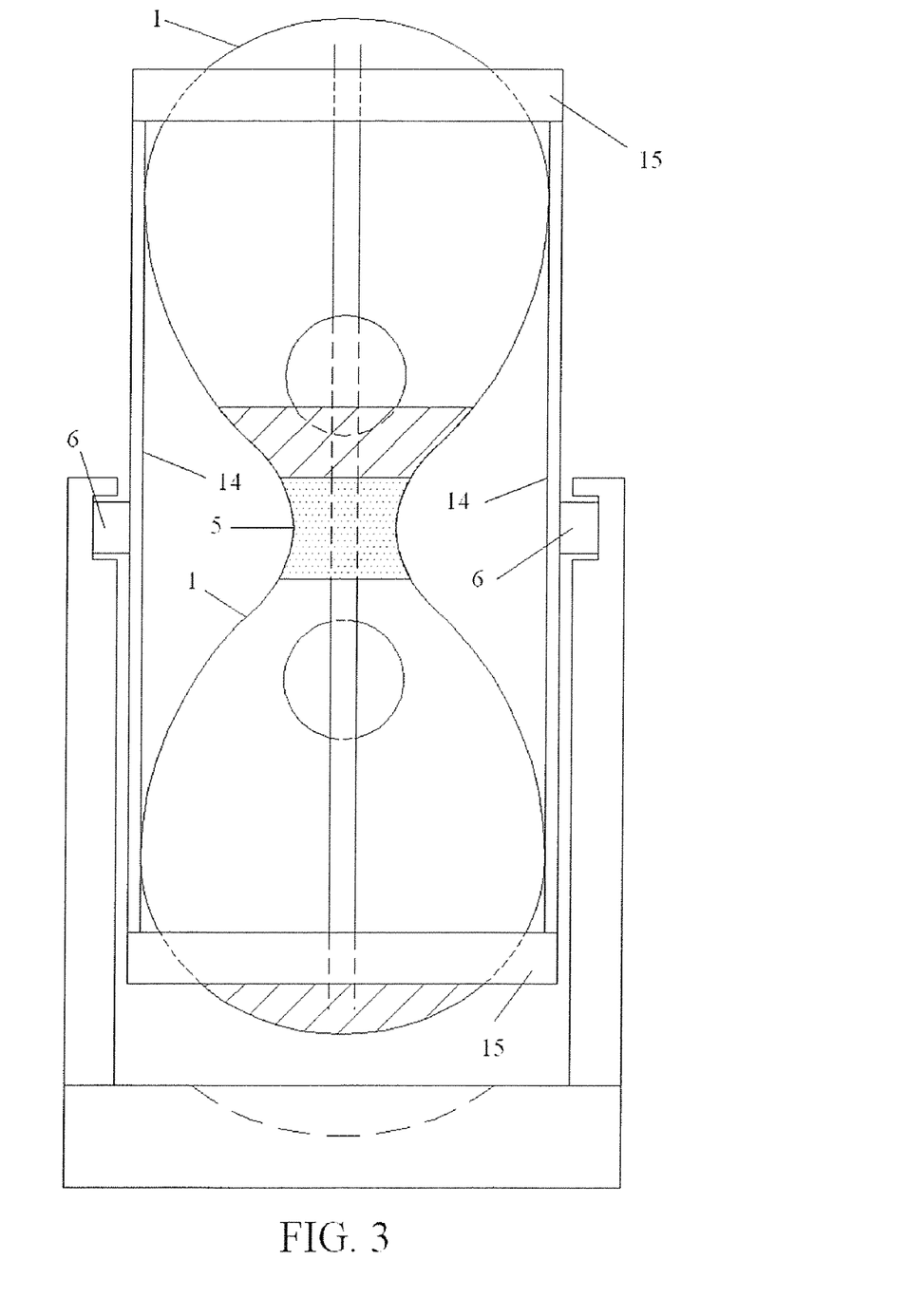
FIG. 3 is a frontal view of an alternate embodiment of an internal displacement vapor pressure rotation device in which a shaft that defines the axis of rotation is maintained between the two chambers but not directly attached to the connecting hollow member.

FIG. 3 is a frontal view of an alternate configuration of an internal displacement vapor pressure rotation device in which a rotational shaft that defines the axis of rotation 6 is connected to support arms 14 that are attached to connectors 15 affixed to each of the enclosed chambers 1. The figure illustrates the shaft maintained between the two chambers need not be directly attached to the connecting hollow member between the two chambers 5 for device operation.

Figure 4:
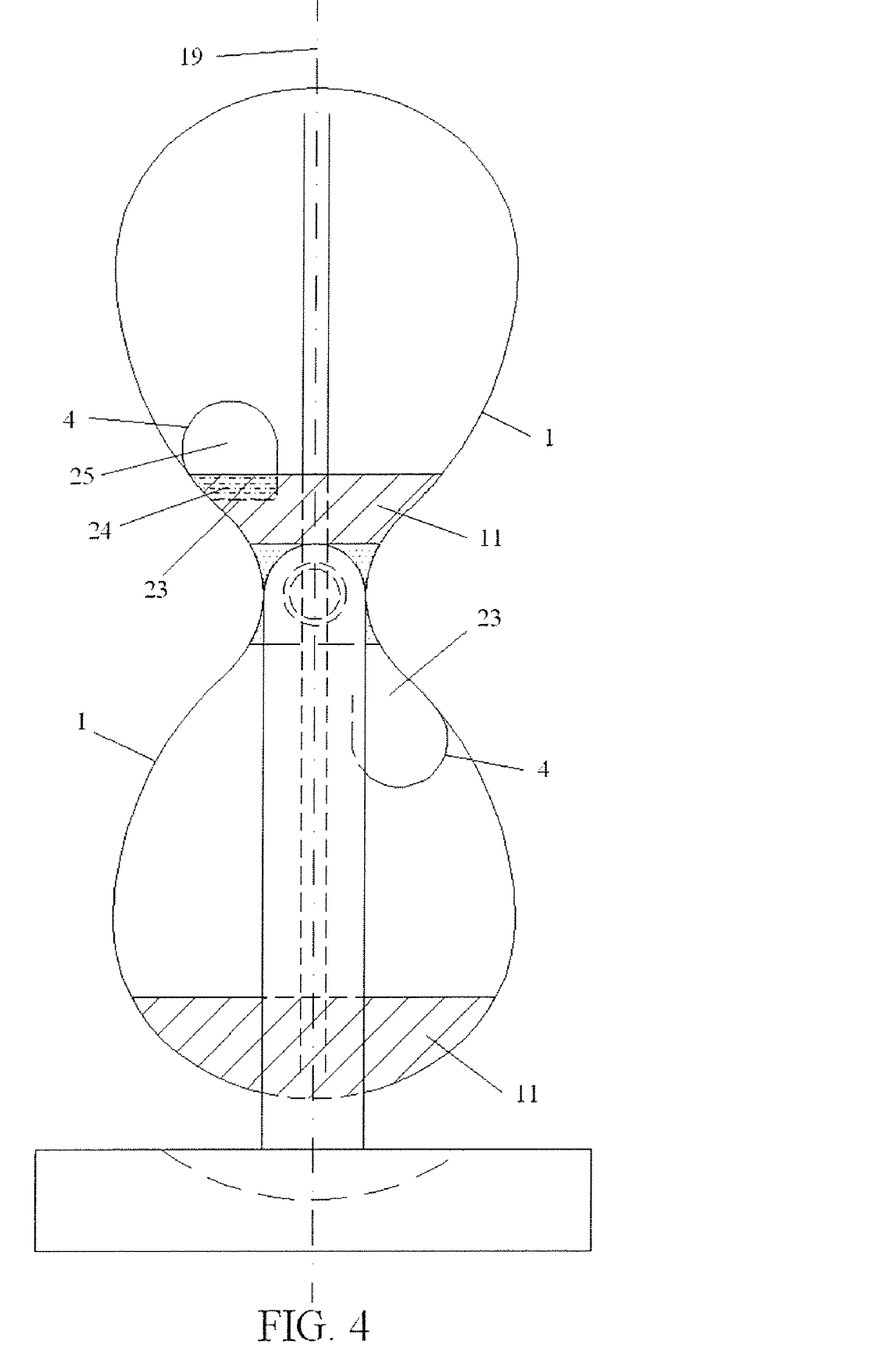
FIG. 4 is a side view of an alternate embodiment of an internal displacement vapor pressure rotation device that illustrates another form of the displacement objects in which open ended displacement objects trap gas to displace the liquid.

FIG. 4 is a side view of an alternate configuration of an internal displacement vapor pressure rotation device that illustrates open ended 23 displacement objects 4 within the two chambers 1. One chamber is positioned above the other. As a substantial amount of vaporizing medium in liquid form 11 collects in the upper chamber by means described within the preceding paragraphs the open end of the displacement object within the upper chamber will be sealed off 24 by the liquid trapping gas 25 initially contained within the displacement object. The gas trapped within the displacement object prevents the liquid from filling it making more liquid collect to the side of the vertical plane 19 that does not contain the displacement object creating a weight imbalance. Gravity acts upon the weight imbalance as previously described to create rotation.

Figure 5:
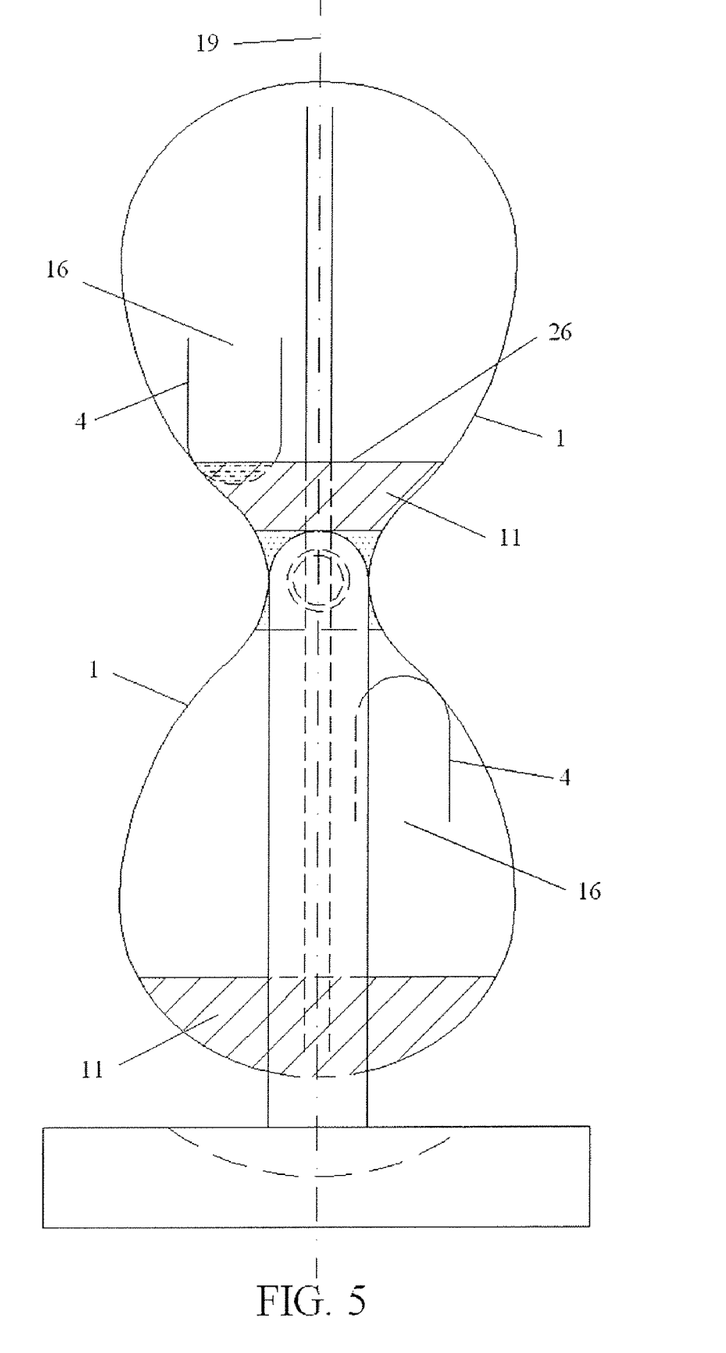
FIG. 5 is a side view of an alternate embodiment of an internal displacement vapor pressure rotation device that illustrates another form of the displacement objects in which open ended displacement objects are partially engulfed but not completely immersed by the liquid.

FIG. 5 is a side view of an alternate configuration of an internal displacement vapor pressure rotation device that illustrates open ended 16 displacement objects 4 within the two chambers 1. One chamber is positioned above the other. A substantial amount of vaporizing medium in liquid form 11 collects in the upper chamber by means described within the preceding paragraphs. The open ends of the displacement objects are configured to remain above the crest 26 of the rising liquid when in the upper position preventing the liquid from filling the displacement object making more liquid collect to the side of the vertical plane 19 that does not contain the displacement object creating a weight imbalance. Gravity acts upon the weight imbalance as previously described to create rotation.

Figure 6:
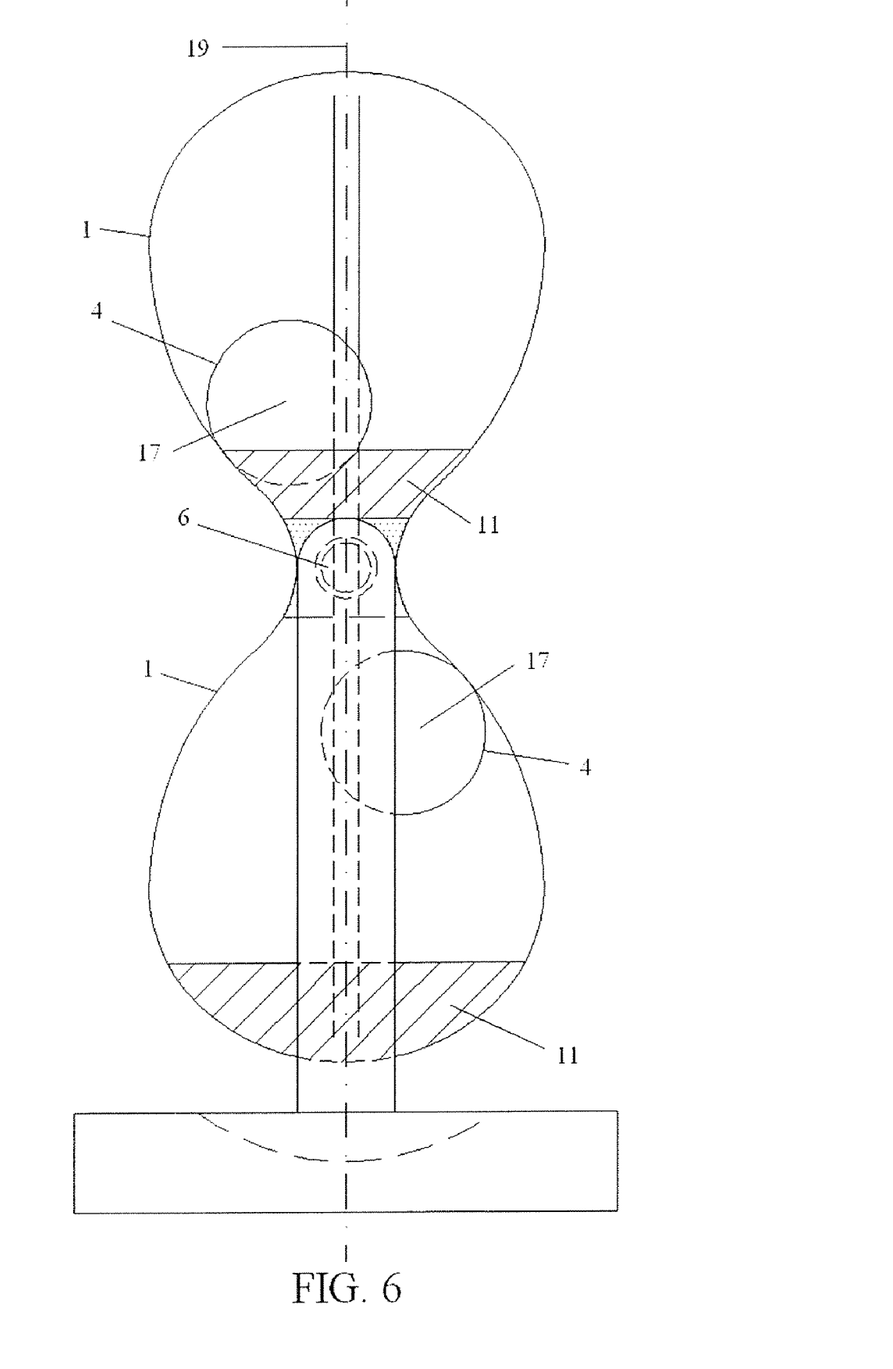
FIG. 6 is a side view of an alternate embodiment of an internal displacement vapor pressure rotation device that illustrates another form of the displacement objects in which the displacement objects partially cross a vertical plane running through the two chambers.

FIG. 6 is a side view of an alternate configuration of an internal displacement vapor pressure rotation device that illustrates the position of two displacement objects 4 separately contained within two chambers 1 with respect to a vertical plane 19 running lengthwise through a rotational shaft that defines the axis of rotation 6 and the two chambers. One chamber is positioned above the other. The displacement objects within the chambers are substantially positioned to one side of the vertical plane running lengthwise through the chambers. The displacement objects cross the vertical plane in such a manner as to ensure that a majority of volume 17 contained by each displacement object is positioned to one side of the vertical plane. As a substantial amount of vaporizing medium in liquid form 11 collects in the upper chamber by means described within the preceding paragraphs more liquid will collect to the side of the vertical plane that is less occupied by the displacement object creating a weight imbalance. Gravity acts upon the weight imbalance as previously described to create rotation.

Figure 7:
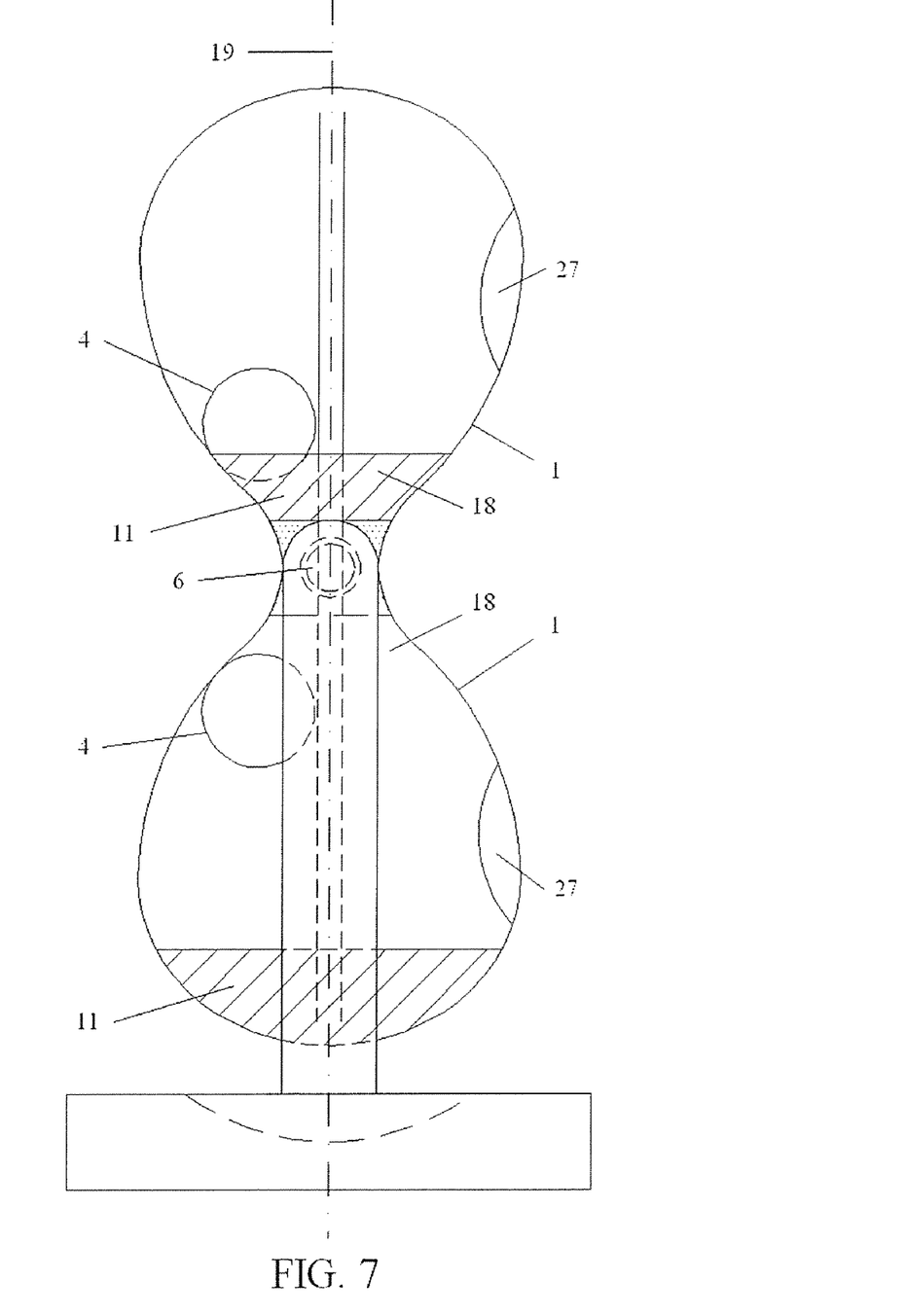
FIG. 7 is a side view of an alternate embodiment of an internal displacement vapor pressure rotation device that illustrates an alternate configuration of the displacement objects with respect to a vertical plane running through the two chambers in which oscillating rotation is created.

FIG. 7 is a side view of an alternate configuration of an internal displacement vapor pressure rotation device that illustrates the position of two displacement objects 4 separately contained within two chambers 1 with respect to a vertical plane 19 running lengthwise through a rotational shaft that defines the axis of rotation 6 and the two chambers. One chamber is positioned above the other. The displacement objects within the chambers are positioned on the same side of the vertical plane running lengthwise through the chambers. The mass of the displacement objects are offset by a counter weight 27 within each chamber that is configured to maintain a balanced device with respect to the vertical plane running lengthwise through the device without taking into account the vaporizing medium 11 contained within the device. As a substantial amount of the vaporizing medium in liquid form collects in the upper chamber by means described within the preceding paragraphs, more liquid will collect to the side of the vertical plane that does not contain the displacement object creating a weight imbalance. The counter weight within each chamber is configured in such a way as not to significantly encroach upon the space 18 on the side of the vertical plane that does not contain the displacement object where the liquid collects when in the upper position to create the weight imbalance ensuring that the counter weight always displaces less liquid than the displacement object located within the respective chamber. Gravity acting upon the imbalance within the upper chamber will create a moment of rotational force in the direction of the heavier side of the chamber which is the side that does not contain the displacement object. The rotational force pulls the upper chamber downward around the axis of rotation switching the position of the upper and lower chambers, referred to as a cycle. The displacement object within each chamber is configured in such a way as to ensure that the weight imbalance occurs on alternate sides of the vertical plane at each cycle to produce oscillating rotation.

Figure 8:
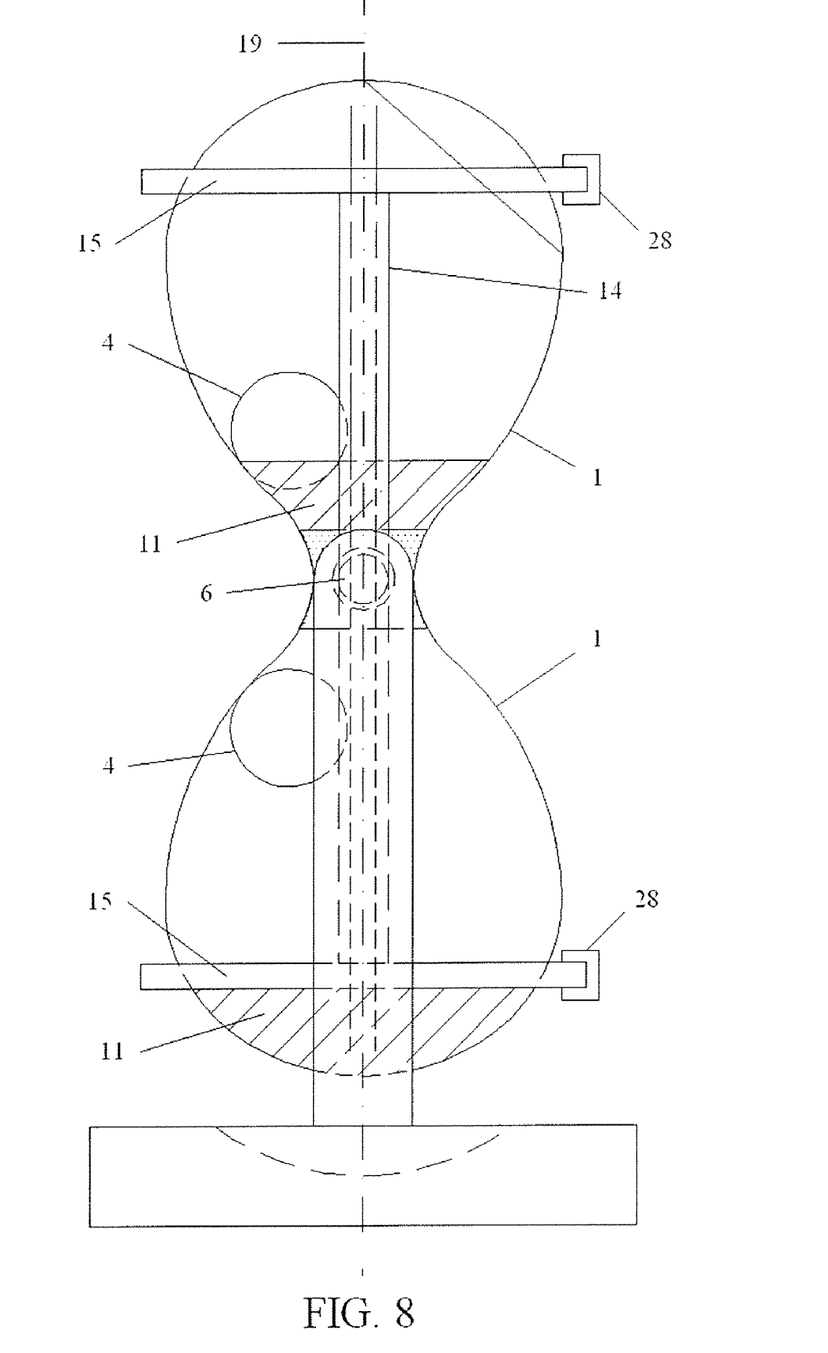
FIG. 8 is a side view of an alternate embodiment of an internal displacement vapor pressure rotation device that illustrates an alternate configuration of the counter weight used to balance the displacement objects with respect to a vertical plane running through the two chambers in which oscillating rotation is created.

FIG. 8 is a side view of an alternate configuration of an internal displacement vapor pressure rotation device in which a rotational shaft that defines the axis of rotation 6 is connected to support arms 14 that are attached to connectors 15 affixed to each of two enclosed chambers 1. One chamber is positioned above the other. Two displacement objects 4 are separately contained within the two chambers. The displacement objects within the chambers are positioned on the same side of the vertical plane 19 running lengthwise through the axis of rotation and the two chambers. The mass of the displacement objects are offset by counter weight 28 located outside of the chambers configured to maintain a balanced device with respect to the vertical plane running lengthwise through the device without taking into account the vaporizing medium 11 contained within the device. The counter weight may be an integral part of the connectors as shown, attached to the support arms or configured in an alternate manner so long as the device is balanced. As a substantial amount of vaporizing medium in liquid form collects in the upper chamber by means described within the preceding paragraphs, more liquid will collect to the side of the vertical plane that does not contain the displacement object creating a weight imbalance. Gravity acting upon the imbalance within the upper chamber will create a moment of rotational force in the direction of the heavier side of the chamber which is the side that does not contain the displacement object. The rotational force pulls the upper chamber downward around the axis of rotation switching the position of the upper and lower chambers, referred to as a cycle. The displacement object within each chamber is configured in such a way as to ensure that the weight imbalance occurs on alternate sides of the vertical plane at each cycle to produce oscillating rotation.

The foregoing explanation of a preferred embodiment and alternate embodiments of the invention has been presented for the purposes of illustration and description. It is not intended to be exhaustive or limit the invention to the precise form disclosed. Many modifications and variations are possible in light of the above teaching.

What is claimed is:

1. An educational mechanical device comprising; two symmetrically constructed enclosed chambers, one designated as a lower chamber and the other as an upper chamber; a hollow member extending into and connecting said chambers to one another; a rotational shaft supporting said hollow member and chambers that defines an axis of rotation between said chambers; a vaporizing medium contained within said enclosed chambers and hollow connecting member; a fixed object within each said chamber, substantially positioned on a predetermined side of a vertical plane running lengthwise through said rotational shaft and chambers, to displace the vaporizing medium contained within said chambers; support arms connected to said rotational shaft on either side of said hollow member and chambers at bearing points to permit 360-degree rotation; a base secured to said support arms below said bearing points; a heat source about said base to excite said vaporizing medium within said lower chamber to create an increase in vapor pressure within said lower chamber relative to said upper chamber that exerts force upon the vaporizing medium within the lower chamber to communicate the vaporizing medium through said hollow member into the upper chamber; when a substantial amount of the vaporizing medium collects in the upper chamber said object contained within the upper chamber becomes engulfed by the vaporizing medium and displaces the vaporizing medium creating a weight imbalance within the upper chamber on the side of the vertical plane that does not substantially contain said object; said weight imbalance within the upper chamber allows gravity to act upon the upper chamber pulling the upper chamber downward around the axis of rotation creating rotation in the direction of the weight imbalance.

2. An educational mechanical device, set forth in claim 1, wherein said heat source is comprised of an electrically resistive component.

3. An educational mechanical device, set forth in claim 1, wherein said hollow member extends into each said chamber a distance just short of the internal surface of said chamber away from the points of entry of said chambers by said hollow member to provide maximum said communication of said vaporizing medium.

4. An educational mechanical device, set forth in claim 1, wherein said enclosed chambers and said connecting hollow member are substantially devoid of air to provide a lower vaporizing temperature of said vaporizing medium.

5. An educational mechanical device, set forth in claim 1, additionally comprising a counter weight or weights to offset the mass of said objects within said chambers when both said objects are substantially positioned on the same side of said vertical plane running lengthwise through said chambers to maintain chamber balance with respect to the vertical plane without taking said vaporizing medium into account.

6. An educational mechanical device comprising a pair of enclosed reservoirs connected by a tube extending into each said reservoir wherein said reservoirs are positioned in such a way that one reservoir is situated above the other; a rotational shaft centrally connected to said device defining an axis of rotation between the two reservoirs; a liquid with a low boiling point contained within said enclosed reservoirs and tube; a fixed displacement object within each said reservoir to displace the liquid contained within said reservoirs wherein a majority of volume contained by said displacement objects is positioned on a predetermined side of a vertical plane running lengthwise through said rotational shaft and reservoirs; support arms connected at each end of the rotational shaft at bearing points to allow 360-degree rotation; a base connected to said support arms; a heat source about said base acts upon the liquid within the lower reservoir to create a higher vapor pressure within the lower reservoir relative to the upper reservoir that exerts force upon the liquid within the lower reservoir driving the liquid through the tube into the upper reservoir; when a substantial amount of the liquid vacates the lower reservoir and collects in the upper reservoir said displacement object contained within the upper reservoir becomes surrounded by the liquid and displaces the liquid therefore creating a weight imbalance within the upper reservoir on the side of the vertical plane that is not occupied by the majority of volume contained by the displacement object; said weight imbalance within the upper reservoir allows gravity to act upon the upper reservoir pulling the upper reservoir downward around the axis of rotation creating rotation in the direction of the weight imbalance.

7. An educational mechanical device, set forth in claim 6, wherein said heat source emits light to promote easy observation of the physical phenomenon.

8. An educational mechanical device, set forth in claim 6, wherein said tube and said reservoirs are comprised of a light transmissive material to promote easy observation of the physical phenomenon.

* * * * *